US010942915B2

(12) United States Patent
Stigsen et al.

(10) Patent No.: US 10,942,915 B2
(45) Date of Patent: Mar. 9, 2021

(54) METHOD AND APPARATUS FOR DATABASE

(71) Applicant: MongoDB, Inc., New York, NY (US)

(72) Inventors: Alexander Stigsen, Allerød (DK); Bjarne Christiansen, Copenhagen (DK); Lasse Reinhold, Hvidovre (DK)

(73) Assignee: MongoDB, Inc., New York, NY (US)

( * ) Notice: Subject to any disclaimer, the term of this patent is extended or adjusted under 35 U.S.C. 154(b) by 16 days.

(21) Appl. No.: 15/804,953

(22) Filed: Nov. 6, 2017

(65) Prior Publication Data
US 2018/0293267 A1 Oct. 11, 2018

Related U.S. Application Data

(62) Division of application No. 14/398,109, filed as application No. PCT/US2013/028738 on Mar. 1, 2013, now Pat. No. 9,811,548.

(60) Provisional application No. 61/640,053, filed on Apr. 30, 2012.

(51) Int. Cl.
*G06F 16/23* (2019.01)
*G06F 16/22* (2019.01)
*G06F 8/30* (2018.01)

(52) U.S. Cl.
CPC .......... *G06F 16/2365* (2019.01); *G06F 16/22* (2019.01); *G06F 16/221* (2019.01); *G06F 16/2246* (2019.01); *G06F 8/30* (2013.01)

(58) Field of Classification Search
CPC .... G06F 16/2365; G06F 16/221; G06F 16/86; G06F 16/283; G06F 16/22; G06F 16/2433; G06F 16/284
See application file for complete search history.

(56) References Cited

U.S. PATENT DOCUMENTS

| 5,808,612 | A | | 9/1998 | Merrick et al. |
| 6,009,428 | A | * | 12/1999 | Kleewein ............... G06F 16/258 |
| 6,088,677 | A | * | 7/2000 | Spurgeon ............... B42D 15/00 705/4 |
| 6,088,717 | A | * | 7/2000 | Reed ....................... H04L 29/06 707/999.01 |

(Continued)

OTHER PUBLICATIONS

PCT/US2013/028738, Jun. 28, 2013, International Search Report.

(Continued)

*Primary Examiner* — Daniel A Kuddus
(74) *Attorney, Agent, or Firm* — Wolf, Greenfield & Sacks, P.C.

(57) ABSTRACT

A method for representing a database in a computer readable medium. Accessing a first table in the database. The first table has rows of data, each row of data having one or more columns. Storing a first representation of the first table in a volatile computer memory in a column-oriented format, the column-oriented format comprising at least one B-tree for at least one column, wherein the B-tree is composed of at least one array and the at least one B-tree includes references to a plurality of arrays, each array of the plurality of arrays comprised of data corresponding to the rows of one column of the table, wherein the storing further comprising storing data corresponding to the rows in a packed format. Storing a second representation of the database on the computer-readable medium, the second representation substantially identical to the first representation.

16 Claims, 8 Drawing Sheets

(56) References Cited

U.S. PATENT DOCUMENTS

| | | | |
|---|---|---|---|
| 6,134,543 A | 10/2000 | Witkowski et al. | |
| 6,208,034 B1 | 3/2001 | Yamaguchi | |
| 6,208,934 B1 * | 3/2001 | Bechtolsheim | G01C 21/3688 |
| | | | 701/428 |
| 6,211,872 B1 * | 4/2001 | Matsutsuka | G06F 9/451 |
| | | | 715/744 |
| 6,374,232 B1 * | 4/2002 | Dageville | G06F 16/2246 |
| 7,206,805 B1 * | 4/2007 | McLaughlin, Jr. | G06F 9/466 |
| | | | 707/999.01 |
| 2001/0029502 A1 * | 10/2001 | Oeda | G06F 16/256 |
| 2005/0027702 A1 * | 2/2005 | Jensen | G06F 16/958 |
| 2010/0191783 A1 * | 7/2010 | Mason | G06F 16/1873 |
| | | | 707/822 |
| 2010/0332401 A1 * | 12/2010 | Prahlad | H04L 67/1097 |
| | | | 705/80 |

OTHER PUBLICATIONS

PCT/US2013/028738, Jun. 28, 2013, Written Opinion of ISA.
PCT/US2013/028738, Nov. 13, 2014, International Preliminary Report on Patentability.
International Search Report and Written Opinion dated Jun. 28, 2013 in connection with International Application No. PCT/US2013/028738.
International Preliminary Report on Patentability dated Nov. 13, 2014 in connection with International Application No. PCT/US2013/028738.

* cited by examiner

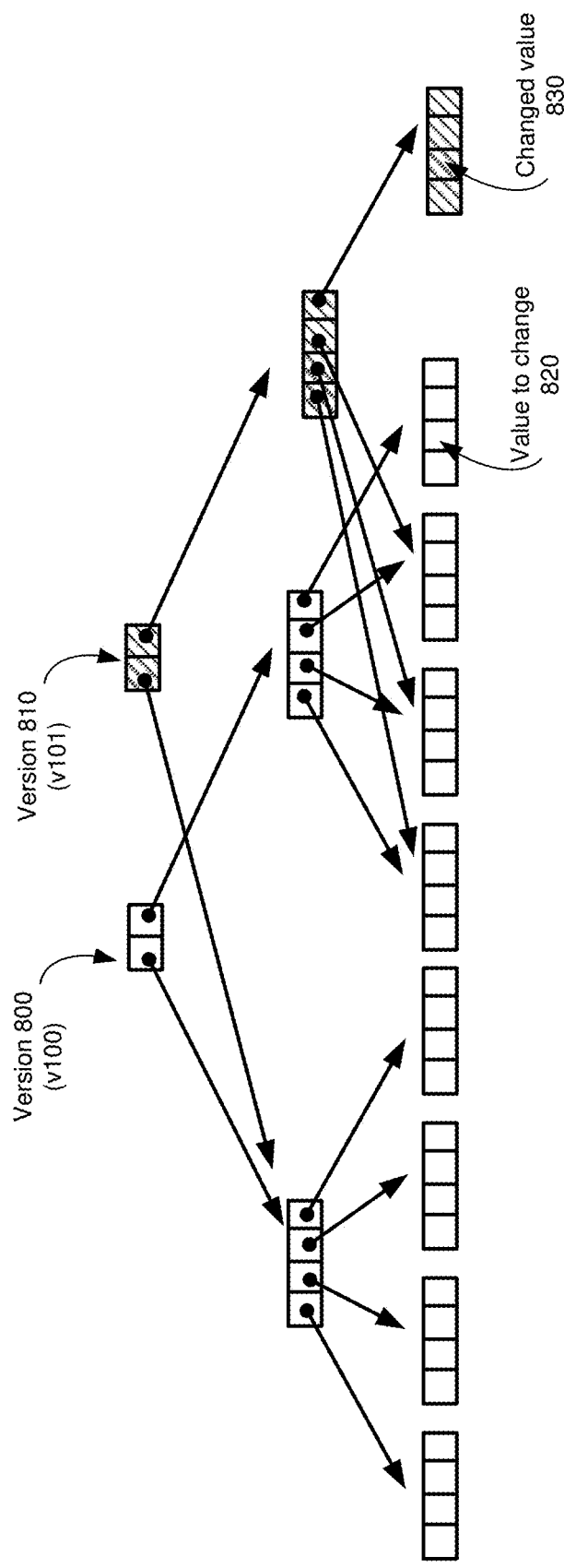
FIG. 8
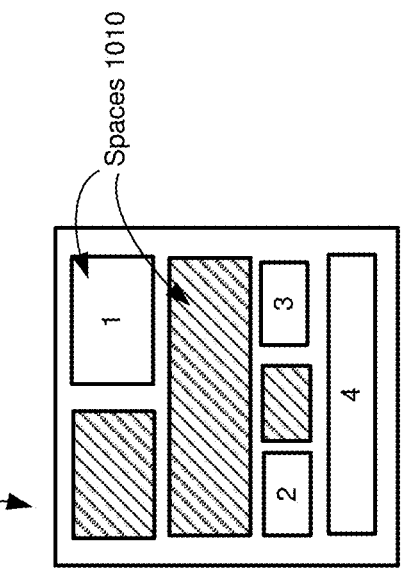
FIG. 10
FIG. 9

METHOD AND APPARATUS FOR DATABASE

RELATED CASES

This application is a divisional of U.S. application Ser. No. 14/398,109 filed 30 Oct. 2014 entitled "Method and Apparatus for Database", which is the national stage of PCT application PCT/US2013/028738 filed 1 Mar. 2013 entitled "Method and Apparatus for Database", which claims priority to and the benefit of U.S. Provisional Application No. 61/640,053 filed 30 Apr. 2012 entitled "Method and Apparatus for Database".

BACKGROUND

Field

This disclosure is generally related to systems for providing efficient databases to programming languages for application development.

Related Art

Database systems, and in particular relational database management systems (RDBMS), are quite commonly used. For current generation programming for the web, the acronym LAMP highlights the interconnected stack of multiple, distinct tools for deploying a meaningful database-driven web application. LAMP refers to Linux, Apache, Mysql, and one of the PHP, Perl or Python programming languages. Integration with the underlying database then is often handled by common libraries such as ODBC and/or object-relational mappers (ORMs) that abstract the underlying (usually SQL) database from the programming language.

Developing applications on this stack is complex and can require multiple tiers of database servers, caches (e.g. memcached), and application servers. In some instances, entire systems of libraries, e.g. Ruby on Rails, or Django on Python, have sprouted up to ease some of the load. Similarly, key-value store systems from Amazon, Google, and/or others are used instead of and/or in addition to more traditional databases to improve read-write times at the expense of losing common database capabilities, e.g. SimpleDB, Google App Engine. This latter trend—whether or not delivered as software as a service (SaaS)—is sometimes referred to as "NoSQL" in deference to the absence of the often ubiquitous SQL language used to query RDBM systems and the differing guarantees such systems offer in comparison to the traditional ACID (atomicity, consistency, isolation, and durability) guarantees, as well as the relational capabilities of an RDBMS.

Most databases use row-oriented storage of data. This provides certain benefits for creation and modification of data, but can be slower for reads. In contrast, other databases use column-oriented storage of data. This can reduce read times, but most traditional column-oriented databases require more write accesses on record creation and modification. See, e.g. "Column-Oriented Database Systems," Stavros Harizopoulos, Daniel Abadi, and Peter Boncz (Presentation at Very Large Databases (VLDB) 2009, Aug. 24-28, 2009).

BRIEF DESCRIPTION OF THE FIGURES

FIG. 8 shows a portion of two versions of a database.

FIG. 9 shows a space version table maintained according to one embodiment.

FIG. 10 shows a symbolic representation of the storage of multiple versions of the data in memory.

DETAILED DESCRIPTION

Overview

Figure 1:
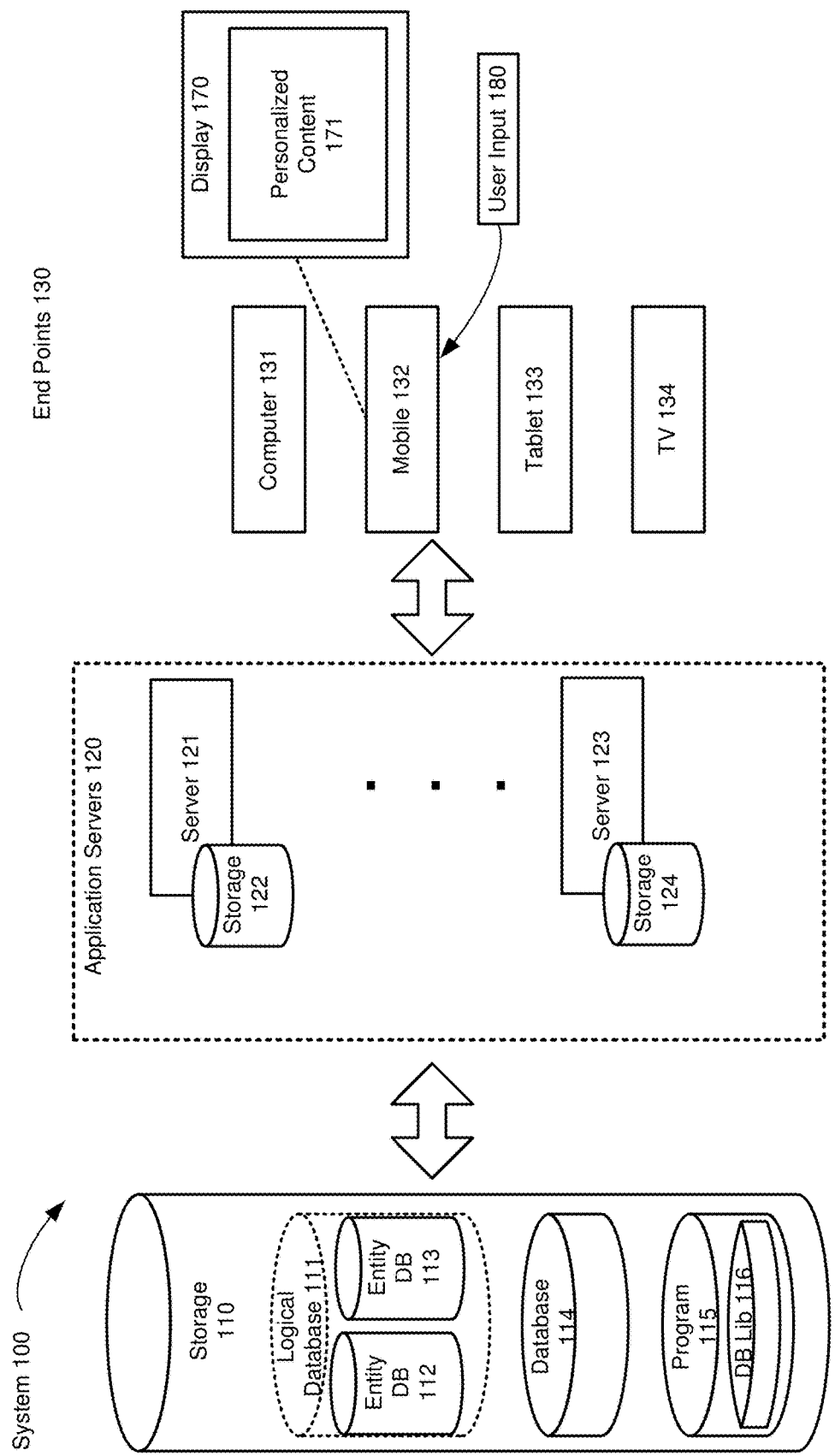
FIG. 1 shows an architectural level schematic of a system in accordance with an embodiment.

The discussion is organized as follows. First, an introduction describing some of the problems addressed by various embodiments will be presented, followed by an explanation of terminology that will be used throughout the discussion. Then, a high-level description of one embodiment will be discussed at an architectural level. Next, some features, as well as the programmer interface used by some embodiments, will be discussed in conjunction with the details of techniques used by some embodiments. Lastly, various alternative embodiments will be discussed.

Consider GameCorp, a game developer that wants to deliver a networked gaming experience, e.g. for web, mobile, and/or computer. Programmers at GameCorp would like to be able to quickly store data about each player using the game, e.g. credit balance, high score, friends lists, achievements, history, transaction logs, in a database. If the GameCorp programmers use a LAMP-style stack or a NoSQL-style stack to develop their application, they will need to contend with significant performance and programming complexities as they scale. It is common in LAMP-style stacks to include a middle tier of caches, e.g. memcached, between a tier of database servers and a tier of application servers the player's computers interact with. Thus embodiments provide for directly integrating a database in a manner that offers ACID and relations as a first-order programming construct into a general purpose programming language.

Further, database structures are not first-order programming objects in current general-purpose languages, e.g. C++, Java, Javascript, Perl, PHP, Python, Ruby. Compare a traditional database with integers or arrays which have well-defined time properties, e.g. O(1) access. In contrast, database structures are accessed via libraries that map between the programming language's semantics and either the row-column-table oriented RDBMS model with ACID and full relations, or a key-value oriented NoSQL model. Thus the onus is placed on the programmer to manage the differences between the programming data structures and the underlying database. As a result, the time properties of using such a database are poorly defined, e.g. some access requests might retrieve quickly, e.g. O(n log n), while others might have significantly longer retrieval times, e.g. O(2ⁿ). Some embodiments provide a database with O(log n) reads and writes with a low constant overhead and no need to map between the different universe of the programming language and the database. This low constant overhead is in contrast to other database systems, which are magnitudes slower. The low constant overhead derives from the structures and techniques used by embodiments to store data compactly in a processor cache-friendly fashion.

Thus, what developers want is an easy way to use existing general purpose programming languages to program use of a database in a manner that offers ACID and relations as a first-order programming construct with predictable time properties more consistent with native types such as integers and arrays. We describe a system and various embodiments to provide such a system.

Terminology

Throughout this specification the following terms will be used:

Database: As used herein, database refers to a data store providing ACID characteristics, e.g. atomicity (each transaction is all or nothing), consistency (each transaction brings the database from one valid state to another), isolation (no transaction can interfere with another transaction), and durability (once a transaction is committed, it remains so). Both the isolation and durability criteria may be relaxed, e.g. some embodiments discussed herein allow reads during writes and define that the earlier data is retrieved as isolation, and similarly some embodiments discussed herein may offer an "in memory" mode where the durability guarantees are relaxed by requiring the programmer to explicitly request that the database be written from the volatile memory of the computers to the nonvolatile memory, e.g. storage such as disks.

Some further characteristics of the databases discussed in the remainder of this document will be illuminating. The databases can be organized as one or more tables, with each table having records with multiple columns. This description does not dictate the storage format of the database in either volatile (e.g. working memory of the computers) or non-volatile memory. In fact, one advantage of some embodiments is the use of column-oriented data structures for storing the database. This is because column-oriented data structures can provide better efficiencies in systems by reducing processor cache pollution and increasing the amount of useful data retrieved by the processor by each read operation. Additionally, greater data storage efficiencies compared to row-oriented storage via packing. Similarly, a key-value store with ACID properties will not be considered a database for the remainder of this discussion. However, some embodiments may use key-value stores as one source of nonvolatile storage of the database.

Further, databases can themselves contain other databases. Taking a concrete example of a database of company employees with a table for employees and another table for jobs, it is possible to consider all of the following as databases as well: the table of employees, the table of jobs, a view that selects a portion of the employee table based on matching department codes. However, in conversation one would talk about having a company employee database—which provides ACID guarantees—not having 3 or 500 databases in this situation. This is also in accordance with the real-world implementation, e.g. in MySQL, SQL Server or Oracle products, one would have a single database of company employees with multiple tables and multiple views, but all of the ACID properties are guaranteed at the outermost level. For our discussions of databases, we will be using this more conversational version and talk about having a single database in this scenario.

The discussion of entity, just below, also indicates that some embodiments encourage unusual data architectures for storing information compared to existing commercial database systems. In particular, in some embodiments programmers may be encouraged to create a significantly larger number of databases (in the conversational sense) than traditional database programming techniques would recommend. To continue with the company database example, the programmer might consider each employee an entity, and create a separate database for each employee. When talking about these embodiments, care will be taken to clarify the usage of the term "database" as to whether the discussion involves the smaller single entity database or the logical database made up of all of the entity databases, or whether an alternative configuration is being used with a single database and special semantics and behaviors around entities.

Entity: Entity is any item that is used as a common identifier across multiple tables. It is perhaps better understood in the context of an example. In a traditional RDBMS structure, a multi-player game would have a database with a table with information about all users (each user being considered an entity). The related information, e.g. transaction history about all users, would be stored in other tables with each row in the table including a unique identifier calling out the relevant user (entity) in one column. Similarly, in a financial institution's database, accounts (entities) are a key concept, and a transaction log table would typical include the bank account (entity). Similarly, in the financial institution case, an account holder could be treated as a single entity—note that for accounts that are multiply titled each unique combination of individuals holding an account could be viewed as a distinct entity. In multi-tenant databases, each tenant could be an entity.

Some embodiments encourage programmers to develop per-entity databases. Thus, instead of creating a single massive database—thereby bucking the multi-tenant, single-database architecture prevalent in software-as-a-service (SaaS) that is common today—each entity, such as a user, a bank account, or a tenant, could be its associated with its own database. This embodiment will be discussed further in connection with FIG. 1 and can provide significant performance improvements over current systems.

Substantially Identical: In the discussion of some embodiments, the substantially identical representation of the database in nonvolatile memory (e.g., disk, flash, SAN, etc.) and volatile memory (e.g., RAM, other working memory of the computer) is emphasized. This phrasing is used because modern nonvolatile storage systems are complex, and while data may be handed to the storage system in one format, e.g. "10101010," it may be written to the actual nonvolatile storage system in another format, e.g. "1" to disk 1, "0" to disk 2, etc. For purposes of this discussion, the nonvolatile and volatile memory representations will be considered to be substantially identical if, at the point where the representation exits or enters the volatile memory to be stored to the nonvolatile memory, the same format is used (which is to say there is no boxing/unboxing, serializing/deserializing). In POSIX terms this means that straight memcopy( ) or mmap( ) from one to the other will suffice. Note that, with respect to the term "substantially identical," basic header information can be ignored, e.g. in some instances the nonvolatile memory version may include additional basic metadata about the database that might be stored differently in the volatile memory version, e.g. version number of the database software/library/programing language that wrote the database, database name, and/or byte order (endianness) of the database. However, both traditional database data and traditional database metadata (e.g. indexes, data model) are the same in both storages.

System Overview

A system and processes to provide efficient first-order databases to programming languages are described. The system will be described with reference to FIG. 1 showing an architectural level schematic of a system in accordance with an embodiment. Because FIG. 1 is an architectural diagram, certain details are intentionally omitted to improve the clarity of the description. The discussion of FIG. 1 will be organized as follows. First, the elements of the figure will be described, followed by their interconnections. Then, the use of the elements in the system will be described in greater detail.

FIG. 1 includes a system 100. The system includes storage 110, application servers 120, and end points 130. Storage 110 includes two databases, logical database 111 and database 114, and program 115. Logical database 111 includes an entity database 112 and an entity database 113. Program 115 includes database library 116. Application servers 120 include server 121 and server 123. Servers 121 and 123 include volatile and/or nonvolatile storage, respectively storage 122 and storage 124. End points 130 include computer 131, mobile 132, tablet 133, and TV 134. The mobile 132 includes a display 170 and a user input 180. The display 170 is displaying personalized content 171. Notably absent from FIG. 1 is a caching layer typical of database-driven applications for the web, e.g. memcached or the like, as well as a layer of database servers.

The interconnection of the elements of system 100 will now be described. The storage 110, application servers 120, and end points 130 are coupled in communication (indicated by double-headed line with arrows at end). All of the communications may occur over a variety of networks, e.g. private networks, VPN, MPLS circuit, or internet, and may use appropriate APIs and data interchange formats, e.g. REST, JSON, XML, SOAP, JMS. All of the communications can be encrypted and/or secured with a variety of techniques.

The storage 110 is shown as a single logical storage entity; however, in fact it can be a heterogeneous collection of storage resources provided either by a single entity or multiple entities. For example, the actual storage for logical database 111 could be comprised of each of the entity databases 112-113 stored as a value in a key-value store of a cloud-provider, e.g. Amazon Simple DB or Google App Engine. Similarly, database 114 could be stored on a RAID array, a storage-attached-network (SAN), a file server, Amazon S3, and/or any other generally nonvolatile storage medium. Thus, most generally, the distinction between storage 110 and storage 122 and storage 124 associated with the application servers, e.g. server 121 and server 123, is that storage 110 is significantly larger and is generally nonvolatile.

The program 115 could be a single compiled program, e.g. single C++ binary, and/or a collection of one or more programs, e.g. multiple Javascript, Perl, Python, Ruby, Java, Flash and/or C++ programs, designed to work together including some that may be transmitted to the end points 130 for execution. Thus, a Ruby on Rails application together with all of the client side Javascript could be the program 115. Portions of the program 115 can execute on the application servers 120, and other portions can execute on the end points 130. For example, with a Flash or HTML5 game, large portions of the program 115 would execute on the end points 130, while other portions, the back end server pieces, would execute on the application servers 120. The program 115 is designed to make use of databases, e.g. database 114 or logical database 111. The database capability can be delivered natively in the language as a baseline feature (otherwise not available in the current generation of Javascript, Perl, Python, Ruby, Java, Flash, C, C++, ActionScript, etc.) or as a library (database library 116) that extends the language to provide the database capabilities according to the embodiments described herein. In embodiments where the programming language has been modified to directly support the database capabilities described herein, the database library 116 can be omitted. Additionally, while the database library 116 is shown as part of the program 115, it can be separately distributed, a shared library and/or otherwise provided independently, e.g. retrieved at runtime from an alternative storage (not shown).

Note that Javascript in some current web browsers does support Web SQL, an asynchronous library implementing an API supported by web browsers for accessing a SQL database directly from Javascript in the browser. This should be viewed much in the vein of ODBC, e.g. a common API that programs can use for accessing a database as opposed to a first-order database from the programming language that is on par with variable types like integers and arrays. Note that when embodiments are adapted to existing programming languages via a library, the behavior is different than described above because the database types presented into the modified programming language behave like native data structures and objects rather than as calls to a library that interfaces with a different (nonvolatile) storage format and requires serialization/deserialization and the like for access.

The application servers 120 include multiple computing and storage resources, e.g. server 121 with storage 122 and server 123 with storage 124. Each application server can include one or more computers and computer systems coupled in communication with one another. They can also be one or more virtual computing and/or storage resources. For example, server 121 may be one or more Amazon EC2 instances and the storage 122 the volatile memory associated with those instances. Other computing-as-service platforms such as Force.com from Salesforce, Rackspace, or Heroku could be used rather than implementing the application servers 120 on direct physical computers or traditional virtual machines. Communications between the potentially geographically distributed computing and storage resources comprising the application servers 120, as well as any load balancers and other supervisory systems are not shown.

The end points 130 are coupled in communication to the application servers 120 (indicated by double-headed line with arrows at end). This communication is generally over a network such as the internet, inclusive of the mobile internet via protocols such as EDGE, 3G, LTE, WiFi, and WiMax. The end points 130 may communicate with the application servers 120 using HTTP/HTTPS protocols and may be implemented in one embodiment using a web interface or application to enable easy support of a range of end point device types. The computer 131 can be any computing device, e.g. desktop computer, laptop computer. The mobile 132 can be any mobile device with suitable data capabilities and a user interface, e.g. iPhone, Android phone, Windows phone, Blackberry. The tablet 133 can be any tablet computing device, e.g. iPad, iPod Touch, Android tablet, Blackberry tablet. The TV 134 can be a TV with built-in web support, for example Boxee, Plex or Google TV built in, or can be a TV in conjunction with an additional device (not shown and often referred to as a set-top box) such as a Google TV, Boxee, Plex, Apple TV, or the like. According to some embodiments, the end points 130 are any web-enabled device supporting some HTML rendering, and the feature set available on a device may be limited depending on the HTML rendering capabilities. In other embodiments, a custom, or native, user interface is prepared for the device, e.g. a device with a more limited web browser but a native widget set might receive a custom application. Similarly, some recent mobile devices, tablet devices, and TVs support an "application store" concept and custom applications could be targeted at such embodiments. In certain situations, the environment may be executing remotely and rendered on the TV, e.g. cable headed computers execute the application and cause the display to be rendered and process user inputs passed back over the system. The display 170 is coupled in communication with the mobile 132, and the mobile 132 is capable of receiving user input 180, e.g. via keyboard, mouse, trackpad, touch gestures (optionally on display 170). The content displayed is personalized to the user, e.g. personalized content 171.

Having described the elements of FIG. 1 and their interconnections, the system will be described in greater detail. Consider the program 115, which in this example will be a multi-user game. The program 115 will be implemented using one or more server-side scripts and programs to maintain state, e.g. PHP, and one or more client-side scripts and programs to display the game to users, e.g. Javascript (with HTML and CSS) for web clients, Objective-C for iOS, Java/Dalvik for Android, etc. We will focus on the PHP and Javascript example. Notably, both the client and server portions of the program 115 may have cause to access databases, and also in some embodiments the database library 116 may consist of different libraries and/or linkages for different programming languages.

Continuing the multi-user game example, in a typical multi-user game a single large database would store all of the user information. Sharding and/or other techniques would then be used to help manage the size of the database. In contrast, in this embodiment, the programmers of program 115 have chosen to take advantage of features of embodiments to create separate entity databases for each user, e.g. entity database 112-113. By putting the majority of information about an entity, in this case, a single user into a standalone database, the entire entity database 112 is more likely to fit into the volatile (working) memory of the application servers 120, e.g. storage 122 and storage 124. This enables the removal of caching layers and database server layers in the backend delivery architecture. This in turn reduces the number of servers (or virtual machines) needed to deploy a database driven solution. On the client side, the ability to work with a database more easily than the existing Javascript Web SQL functionality, with databases as true, synchronous first-order objects in the language like integers, arrays and strings, opens up the possibility of features such as downloading a database of items in the game, e.g. database 114, directly to the client as a single, easily cached resource that can be directly accessed in Javascript.

This is a good juncture to distinguish embodiments from Javascript Web SQL and similar ODBC-type libraries. In a Web SQL or with ODBC libraries you still need to generate query strings, pass those strings to a database engine and then interpret and deserialize the results. This is quite different from the normal modes of programming where you can easily iterate over entries or directly access individual entries, a challenging—and slow—endeavor with these approaches in that the performance is starkly different from native data types like an array. Similarly, object relational mappers (ORMs) require you to define an object hierarchy and then handle the serialization and deserialization of the objects.

On the surface embodiments may seem similar to an ORM, but functionally they are quite different. While an ORM presents a language specific interface to a database, it does so in the sense of serving as a cache. The data is not native so you are copying data back-and-forth from the database into objects. One evidence of this is that many ORMs require explicit saves to preserve objects after changes. In contrast, embodiments provide the data and the database directly to the programming language, just like the language's own native data types and structures. Embodiments replace the programming languages own internal representation of the data with a more efficient representation. Since embodiments are designed for in-memory representation directly (e.g., volatile memory) there is no need for the back-and-forth copying. This makes it possible to use a database in the same random access manner you can with native data structures, and programmers can interact with the data directly. This is an important and different usage pattern. For example, a programmer concerned about performance would usually not consider replacing a data structure like a basic array in a program with those delivered from an ORM, even with the database running locally. The limitations and performance implications would be difficult. In contrast, embodiments make the option of using a database potentially desirable given the fast performance and low memory footprint improvements combined with ACID guarantees that can be delivered by embodiments.

Database Structure

Some details on the database structure used by embodiments and the integration into programming languages will now be discussed. Consider the most basic case of wanting to store a simple three-column data structure, e.g. name, age, and whether or not to invite the person, e.g. invite. In traditional programing approaches, this might be implemented as an array of structs (C/C++ type languages) and thus be stored in volatile memory in a row-oriented fashion. Programmers working in languages like Javascript, Ruby, Perl, PHP, Python could use associative arrays or objects instead of structs. Both approaches are wasteful of memory space—which results in performance impacts. Neither approach provides a substantially identical volatile/nonvolatile storage format, e.g. JSON text formats for associative arrays can impose significant serialization/deserialization penalties.

Further, none of these structures or approaches provides a database as a data type to the programming language. Programmers can make use of libraries or APIs that allow database access, e.g. ODBC, OLE, or implement their own database. However, such databases have highly variable performance characteristics. Thus, programmers working with them must be acutely aware that they are making calls against the database as opposed to the time performance characteristics of first-order variable types such as integers, strings and arrays.

Embodiments make use of a packed, column-oriented storage of data in a B-tree structure recursively composed of adaptive arrays to provide an efficient solution. This presents a database to programming languages as a first-order object with extremely rapid performance characteristics.

Returning to the three column database example (name, age, and invite), embodiments using Javascript and PHP for instantiating such a database are shown:

| Javascript | PHP |
|---|---|
| var table = new tightdb.Table({name : "string", age : "int", invite : "bool"}); | $table = new Table(array("name" => "string", "age" => "int", "invite" => "bool")); |

Figure 2:
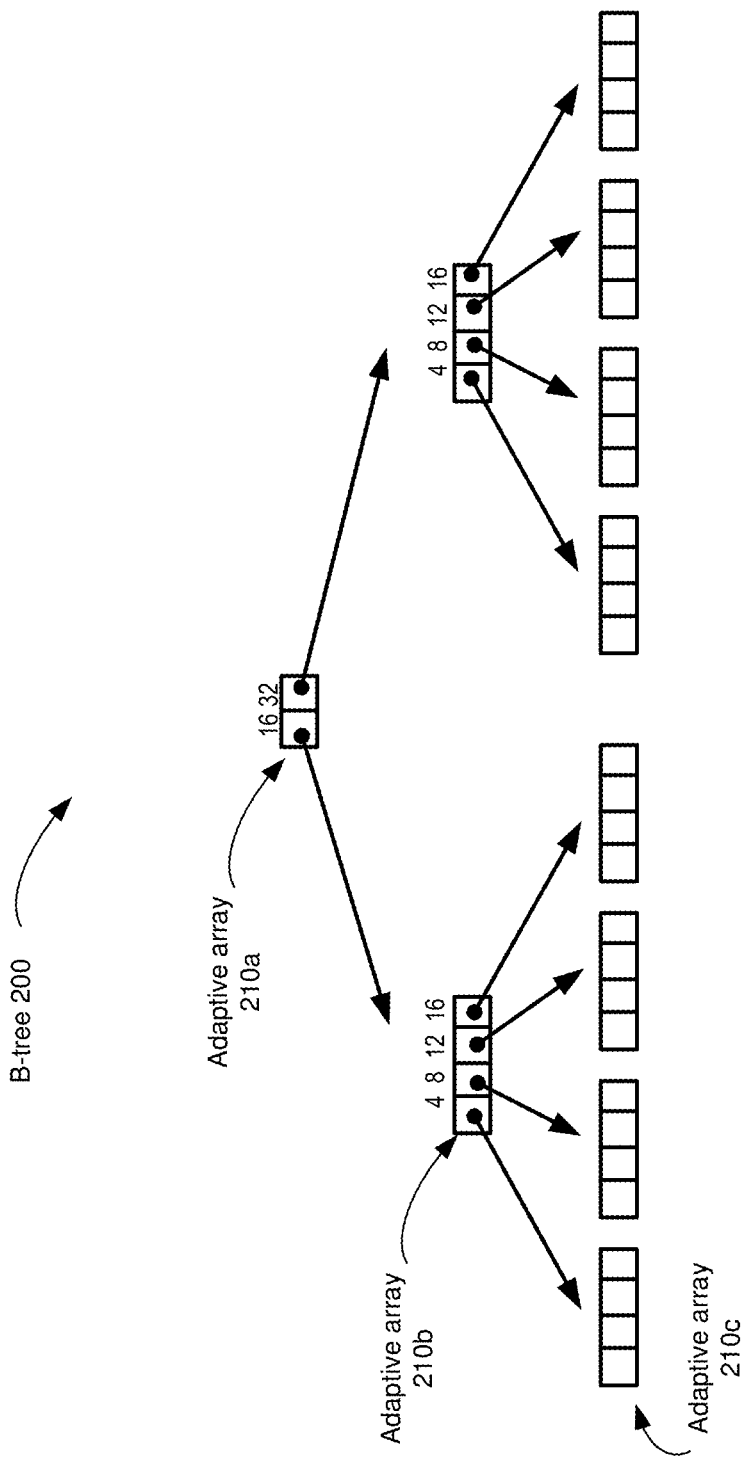
FIG. 2 shows an architectural view of a recursive, adaptive array B-tree structure in accordance with an embodiment.

Having just created a database we will now look at how the database would be stored. FIG. 2 shows an architectural view of a recursive, adaptive array B-tree structure for storing a database column in accordance with an embodiment. This format is highly efficient generally and optimized for single column search and iteration. Specifically, by using a column-oriented format, the need to load unrelated data (from the other columns in a row oriented database) is avoided. This in turn reduces pollution of the processor cache. Modern processors retrieve entire cache lines from volatile memory, typically 64 or more bytes. Thus, in a row-oriented layout, any read of a single value will bring in unrelated surrounding data. Further, reading memory into the cache is a slow process compared to the processor speed. Thus, one B-tree, e.g. B-tree 200, can be created for each column that is composed of adaptive arrays, e.g. adaptive arrays 210a-c.

Further, unlike the struct-type approach, the data can now be packed. Generally packed data means data stored without unnecessary information. For example if integers normally require 32 bits for storage, but the specific integers being used are all only 8 bits in reality, then four, 8 bit integers can be stored in one 32 bit word. Packing opens up the possibility of processing multiple values simultaneously, e.g. 32-bit operations could perform tests on four integers at a time instead of one. Similarly, if the processor has 256 bit vector instructions, then instead of eight, 32 bit integers being tested simultaneously, thirty-two, 8 bit integers can be tested simultaneously. At the time of filing, 128 bit vector instructions (e.g. Intel's SSE instructions) are common and 256 bit instructions (e.g. Intel's AVX instructions) are only emerging. If a number larger then the current packing size arrives, then the data structure can be modified as described below. The specific packing approaches used by some embodiments for certain data types will now be described. Packing data increases the likelihood that each read from the volatile memory—or the nonvolatile memory—by the processor to retrieve data fetches the maximum number of actual values for a column. In contrast, in a row oriented database, packing would not provide the same efficiency because a packed integer would simply be stored against the next column as opposed to the next integer in the same column.

Boolean storage is thus reduced by packing to a single byte or 8 values per byte, but each value can be accessed in constant time with simple bit shifting.

As discussed integers can be dynamically packed to a width that is a power of two. By adapting the width of the storage in the array to the largest value on insert, unused space can be conserved. By adapting the width of the array in intervals of 1, 2, 4, 8, 16, 32 and 64 bits, data will fit well within a 64 bit word with minimal overhead for retrieval.

Additionally, highly repetitive strings can be automatically converted to enumerations, e.g. quarters ("Q1", "Q2", "Q3", "Q4"), days of week, months, and can be stored as small integers, e.g. 1-4 bits, and an additional dynamic array of strings can be created to serve as a lookup table from the small integers to the string.

During searches of a column, entire 64 bit, or larger, blocks can be simultaneously examined, e.g. with vector or SIMD instructions. For example, modifications of algorithms to detect zeros in words can be used to work on arbitrary bit widths.

Strings can be similarly packed as done with integers. The longest string can set the width of the array (to 1, 2, 4, 8, 16, 32 or 64 bytes). Smaller strings are padded with zero bytes to fit the width. Note that padding the string with zeroes is somewhat unusual for a packed data structure as it does add some overhead. However, the added overhead is offset by the savings of eliminating the need to store lengths and/or offsets. Since strings are sequential in memory and aligned, searches are very fast. Longer strings can be stored without a focus on alignment, but back-to-back together with length and/or offset information stored separately. This storage optimizes for substring matching by allowing retrieval of fixed blocks of data for matching and then determining the appropriate row using the length and/or offset information.

In some embodiments, non-aligned string columns also are paired with a separate adaptive integer array maintaining the positions of each string's end point. This enables a string's position and length to easily be determined.

In one embodiment, all strings can be zero terminated (both in aligned and non-aligned representations). This permits string access, via a direct pointer, avoiding memory copies. In some embodiments, the pointer provided is to a read-only shared memory avoiding the possibility of writes to stray pointers.

Notably, some embodiments do not make use of compression of data in the ordinary course. This is in contrast to many column-oriented databases.

As noted, the data for the columns is stored using a B-tree structure which is composed of adaptive arrays. This avoids the need to pre-allocate vast extra capacity to make room for inserts. Thus, each column is split into blocks, which become leaves in a B-tree. A custom B-tree variation is used in some embodiments which, instead of values, tracks the number of entries in each block (similar to the discussion of tracking end points of non-aligned string columns). This allows very fast lookups across columns based on position.

In one embodiment, each adaptive array can hold up to 1000 values before the array is split into multiple arrays. In some embodiments, each adaptive array is pre-allocated at this size, while in other embodiments smaller allocations are made first and the array is grown as needed. Of note, this is the number of values contained in the array, not bytes; thus, for larger sized items like strings it would be larger than for 1000 Boolean values. The specific limit selected was determined from analyzing performance with an 80/20 read/write workload. Higher limits work better for higher read workloads, e.g. no limit is ideal for static data. Similarly, lower limits work better for higher write workloads. In some embodiments the adaptive array limit can be adjusted by the programmer either directly by setting the limit and/or indirectly by signaling the read/write workload. If a new item is to be added that would exceed the limit of the adaptive array, a new leaf node is created (may require splitting if within an existing leaf), and the addition will propagate upwards in the B-tree. In other embodiments, the size of the adaptive arrays is matched to a power of 2, e.g. 1024 instead of 1000 entries.

In some embodiments, the initial values provided set the size of common fields, e.g. first inserted integers appear to be 8 bits, and then the values can be repacked as larger items need to be stored. In other embodiments, the programmer may provide an indication of the maximum size, e.g. specifically declaring a field as 16 bit integers. However, in some embodiments the system may disregard such indications until integers of that size are received, e.g. the programmer "over declares" a need for 16 bit integers but only is storing 8 bit integers; the system packs the data in 8 bits until a 9-16 bit integer is received for storage. It is quite unusual for either a programming language level data structure or for a database to disregard explicit programmer intent; however, disregarding programmer intent in this instance can provide performance improvements. At the time the column needs to be repacked, a new B-tree recursively composed of adaptive arrays can be created at the new bit width; the values from the old B-tree can be copied and then the database pointed at the new B-tree. Similarly, periodic repacking efforts may enable space savings, e.g. a field that used to hold long strings now holds shorter ones and can be repacked down. In other embodiments, the data can be expanded to 16 bits in place. Note this may require some re-allocation if the capacity is overused. However, if the array is already set up to store 1000 items and there are only 200 at present, you can start at the end and repack the data in place without overwriting existing values. This in-place repacking might temporarily block reads of this column or of a portion of the column.

As the example that started off this section showed, the primary interface to programmers for the database is as a table. In one embodiment, a table is a collection of typed columns that are kept in synchronization and accessed as a unit. This provides the illusion of rows to the programmer. Database features such as column names, whether an index has been created, and other constraints and metadata, e.g. uniqueness, can be tracked by embodiments at the table level. Schema changes are just adding or removing columns, a very lightweight operation.

When doing queries and other forms of searching, it is common to want to return a result set to the programmer. Accordingly, some embodiments support virtual tables which are implemented as a single column with references to the matching rows in the original. In some embodiments, virtual tables support the same programing language semantics as the original table. This enables both reads and writes to the values; thus, changes made to the virtual table will be reflected in the original. In some embodiments the virtual table is static, e.g. reflects the results at the time of the query; in other embodiments, the virtual table is dynamic and reflects subsequent changes to the table.

Linear searches over columns can be a very fast operation; in some cases indexes can further improve speed if the programmer is willing to trade off greater memory consumption and longer inserts. An index can be implemented in embodiments as another column, e.g. another B-tree recursively composed of adaptive arrays this time organized by values with references to the matching "row."

Javascript Example Embodiment Details

An embodiment based on the Javascript example started above will be considered here in greater detail. The table can accept inserts using the push method; here 4 rows are added to the table:

```
table.push({name: 'John', age: 20, invite: true}) // long form
table.push(['Lars', 32, true]);        // short form
table.push(['Phil', 43, false]);
table.push(['Anni', 54, true]);
```

The database can be accessed in order and insertions made at any point, for example "Frank" could be added as the second position: table.insert(2, {name: 'Frank', age: 34, invite: true}). If the program were running, the number of rows could be checked, e.g. table.length, and 6 would result. The B-tree storage format helps with rapid, direct positional access as well as updates.

Values can be retrieved and modified using array syntax:

```
table[3].name;     // Returns 'Phil'
table[3].age;      // Returns 43
table[3].age = 44
table[3].age;      // Returns 44
table[4] = {name: 'Eric', age:50, invite: true};
                   // replaces row 4
delete table[2];   // Deletes 'Frank' record
```

Consider iteration and searching semantics:

```
table.forEach(function(x) {
    var s = String.format("{1} is {2} years old.",
        x.name, x.age);
    puts(s);
});
// Outputs:
// John is 20 years old.
// Lars is 32 years old.
// etc
```

Searching and iteration through results works similarly, using the find method. This example adds another person named "Phil" and demonstrates the iteration across search results:

```
table.push((name: 'Phil', age: 22, invite: true});
var result2 = table.find({name: 'Phil'});
result2.length;       // Returns 2
result2.forEachWithIndex(function(x, i) {
    var s = String.format("There is a {1} in row {2}",
        x.name, result2.srcPos(i))
    puts(s);
});
// Outputs:
// There is a Phil in row 2
// There is a Phil in row 4
```

The Javascript results variable is a virtual table that can be directly modified—with changes affecting the master table.

More advanced queries can make use of additional methods: equals( ), notEquals( ), lessThan( ), lessThanOrEqual( ), greaterThan( ), greaterThanOrEqual( ), between (integer, integer), in(array of integers), contains(string), startsWith(string). These can be linked with the do ( )method. Other execution commands include aggregate commands like count, min, max, and average. As well as modification commands, e.g. delete or increment. Some embodiments support lazy iteration over a query, here is an example using C++ 11 syntax:

```
for(auto row; table.where( ).age.between(18,30)) {
    if(matches_complex_predicate(row)) break;
}
```

Where in the example matches_complex_predicate is a programmed defined function that tests aspects of a row against arbitrary criteria.

Subtables, Links, Aggregates and Additional Features

Additional features of some embodiments include tables with columns that are themselves tables, e.g. subtables, the ability to use links or pointers to other tables instead of joins, and advanced searching.

In some embodiments, the column types supported by embodiments include Booleans, integers, strings, dates, mixed values, binary data (BLOBs), and tables. Mixed value column types support automatic type inference among Booleans, integers, strings and dates. As discussed below, some embodiments also support subtables and links as column types.

In some embodiments, aggregate functions are provided for integer and date types such as min, max, and sum. In one embodiment aggregates are calculated on request, e.g. O(n). However because the aggregate is computed by working directly on the packed, column-oriented B-tree storage format, the computation is highly efficient and has a very low constant factor. Thus it can execute as fast as a for-loop over a standard array. In other embodiments, these aggregate values could be cached in the B-tree (not shown in FIG. 2) for even more efficient computation.

In some embodiments, additional approaches are provided for more fluent queries, e.g. table.equals('name', 'Phil').greaterThan('age', 20).do( ) etc. Even more complex queries can be structured using a begin( ), endGroup( ), do( ) to create groups of conditionals.

In some embodiments a group of tables can be defined as a group. A group is a collection of one or more tables that can be managed as a single database.

Subtable queries can be managed through chaining, e.g. if there is a phone number subtable column named numbers added to our table that can hold multiple numbers and their type, e.g. home, work, mobile, the subtable could be queried in a straightforward manner. For example, table[5].numbers[1].type would return the type of the second phone number stored for the 5$^{th}$ record. In some embodiments, overriding the programming language can allow direct lookups (at least for unique fields), e.g. table["Sara"].numbers["home"] thus avoiding the need to explicitly call find methods.

In some embodiments, to avoid the computationally pervasive join-oriented operations of SQL databases, a pointer or link column type is supported. This acts as an index or key that can be directly followed to other tables. As of this writing, NoSQL-style databases lack direct links as first-order types. Consider a simple example of two tables, one for orders and one for buyers. One column in the order table will refer to the buyer table.

```
// name, city
buyers.push("John", "New York");    // John = buyers[1]
buyers.push("Jim", "Seattle");       // Jim = buyers[2]
buyers.push("Sara", "New York");     // Sara = buyers[3]
// product, price, buyer
orders.push("Shoe", 12, buyers[2])   // Jim
orders.push("Sock", 3, buyers[3])    // Sara
orders.push("Hat", 7, buyers[1])     // John
// direct access
orders[2].buyer.name                 // Returns Sara
```

Other more interesting queries become possible, e.g. "orders where buyer.city=="New York"" or "orders where buyer==buyers[2]". Note that these are true links to the specific buyer entry, e.g. if a new buyer is inserted the orders table will not change, e.g. "buyers.insert(0, ["Clara", "Miami"])", will not cause any orders to point to Clara. Deleting items will result in a null linkage. In some embodiments an isValid( )method is added to test for valid linkages.

Other supported functionality includes automatic creation of related records when modifying null links. Also, if two records are swapped, the linkage is maintained. This greatly simplifies the burden on the programmer to work with linked records. For example, in the example above if standard programming language pointers were being used, the programmer would need to manually adjust all pointers in the product table to point to the correct buyer. However, links are automatically updated and as a result can act much like a foreign key in a traditional RDBMS would during a JOIN operation.

Still other embodiments directly modify programming languages to support a more native query syntax, e.g.:

```
// Sample proposed native format
for x in table where name == "Jack" and age < 26
    print x
// Approximation of native format in C++ using macros
TDB_QUERY(TestQuery, MyTable) {
    name == "Jack";
    age < 25;
};
MyTableView result = table.FindAll(TestQuery( ));
```

Also, it bears mentioning that each row of the examples should be understood to be a transaction on the database, e.g. ACID. Thus, when a row is added, that is a transaction. A query is a transaction. In some embodiments, a single writer is supported with non-blocking reads (old data returned to the reader). Other embodiments support multiple writers provided the writes are in different subtrees of the B-tree.

Performance

Before discussing other features, the performance characteristics that embodiments can provide are considered. In this example, US flight traffic data was benchmarked using embodiments running on Linux, x86_64, using PHP 5.2.10 to access embodiments, as well as commercial and open source database systems running on the same hardware. The data set chosen was the January 2008 US flight traffic data of about 600,000 total rows, see explore.data.gov/Transportation/Airline-On-Time-Performance-and-Causes-of-Flight-D/ar4r-an9z. Times in the table are shown in seconds and averages for 25 runs; lower numbers are better and reflect faster performance:

| Database | Version | Benchmark | | | |
| --- | --- | --- | --- | --- | --- |
| | | Destination | Total Delay | Day | Number of Delays |
| Mongo | 2.0.2 | 1.932600 | 6.553400 | 0.579800 | 1.096700 |
| MySQL (index) | 5.1.49 | 0.411300 | 0.064900 | 0.762600 | 0.851900 |
| MySQL | 5.1.49 | 1.659414 | 0.479038 | 0.817686 | 0.913907 |
| SQLite | 3.7.2 | 1.211600 | 0.899100 | 0.878700 | 1.837600 |
| PosgreSQL | 8.4.10 | 0.705361 | 0.371098 | 0.245021 | 0.383092 |
| PosgreSQL (index) | 8.4.10 | 0.262066 | 0.039674 | 0.240032 | 0.375907 |
| Test Embodiment Solution described herein | Tightdb | 0.003441 | 0.015270 | 0.027630 | 0.015650 |

In each case, the test embodiment of the Tightdb solution described herein offered significant performance improvements. In most of the tests, the performance improvement was a factor of 10× or more.

The destination benchmark retrieves all flights to a randomly selected airport. The result set is rows that are distributed across the original data set, 60-20,000 rows. Note for the testing only the following airports were used: "LAX," "DEN," "AUS," "PHX," "JAX," "DAL," "DAY," "COS," "TEX," and "JFK." The SQL query used on the comparison databases was "SELECT * FROM flight_ontime WHERE DEST='xxx'". The test embodiment query using PHP syntax to query the database was: $t→find_all ("Dest", $ap).

The day benchmark counts the number of flights on a randomly selected day. The size of the result set is in the range of 16,000-21,000 rows. The SQL query used on the comparison databases was "SELECT COUNT(*) FROM flight_ontime WHERE DayofMonth=nnn AND Year=2008". The test embodiment query using PHP syntax to query the database was: $t→query( )→group( )→eq ("DayofMonth", $day)→eq("Year", 2008)→endGroup( )→count( ).

The number of delays benchmark counts the number of delayed flights (delay amount randomly selected) and the range of results was between 30,000-69,000 rows. The SQL query used on the comparison databases was "SELECT COUNT(*) FROM flight_ontime WHERE ArrDelayMinutes>=nnnn". The test embodiment query using PHP syntax to query the database was: $t→query( )→gte("ArrDelayMinutes", $delay)→count( ).

The total delay benchmark adds all of the delays for all flights to a randomly selected airport. A single summation was returned. The SQL query used on the comparison databases was "SELECT SUM (ArrDelayMinutes) FROM flight_ontime WHERE Dest=' xxx'". The test embodiment query using PHP syntax to query the database was: $t→query( )→eq("Dest", Sap)→sum("ArrDelayMinutes")

The performance results for a test embodiment that has not undergone deep performance tuning and years of development and can highlight the benefits offered by the data storage and retrieval structure used by embodiments to store database tables and columns as described, e.g. packed, column-oriented B-tree structures recursively composed of adaptive arrays. See discussion of FIG. 2 above.

Similarly, the storage size of this database (nonvolatile storage) is quite striking as well, with existing database systems taking 3-92× more space to store the same data:

| Database | Size on disk (kb) | Factor compared to Tightdb |
|---|---|---|
| GZIP of test embodiment | 13596 | 0.2 |
| GZIP CSV | 26332 | 0.5 |
| Test Embodiment Tightdb Solution Described herein | 56288 | 1.0 |
| CSV | 194460 | 3.5 |
| Mysql | 406528 | 7.2 |
| Sqlite | 807692 | 14.3 |
| MongoDB | 5193772 | 92.3 |

It is also worthy of noting that loading the data into one embodiment reduced the entropy in the data so that it could compress more than the original source as shown by the GZIP results, e.g. compared to the CSV file.

Insertion, Deletion and B-Tree Structure

We return to the recursive, adaptive array B-tree structure described above. The example of FIG. 2 will be considered now with real data in the context of FIGS. 3-5 which show a portion of a specific recursive, adaptive array B-tree structure in accordance with an embodiment. In this example, the adaptive array size limit has been set to 4 (versus 1000 normally, see discussion above), for purposes of illustration.

We will consider a database with nine columns with their respective types: int (int), bool (bool), date (date), string (string), string_long (string), string_enum (string), binary (binary), mixed (mixed), and tables (subtable), where the tables column has two columns first (int) and second (string). Some rows of sample data can be added, e.g. 0-to-num rows for the int field; random values for the bool, date, binary, and mixed fields; some short strings for the string field; longer strings for the string_long fields; repetitive values like test0, test1, test2, test3 for the string_enum field, and so forth. E.g. "0, false, xx-xx-xxxx xx:xx:xx, "string0", "string0 very long string", "test0", b(7 bytes), false, [first: 1, second: "string0-1"]". For this example, 15 rows are added.

Figure 3:
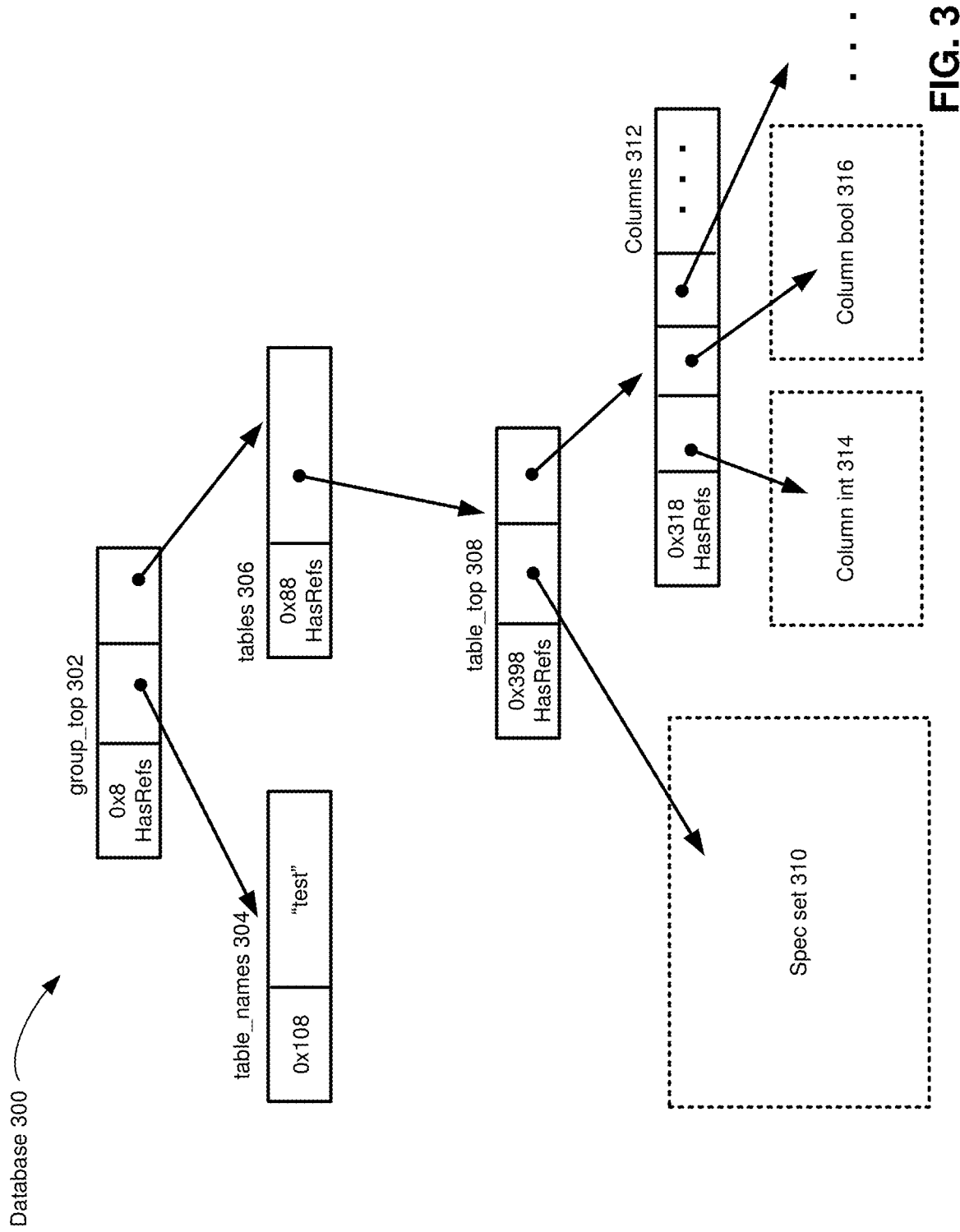
FIGS. 3-5 show a portion of a specific recursive, adaptive array B-tree structure in accordance with an embodiment.
Figure 4:
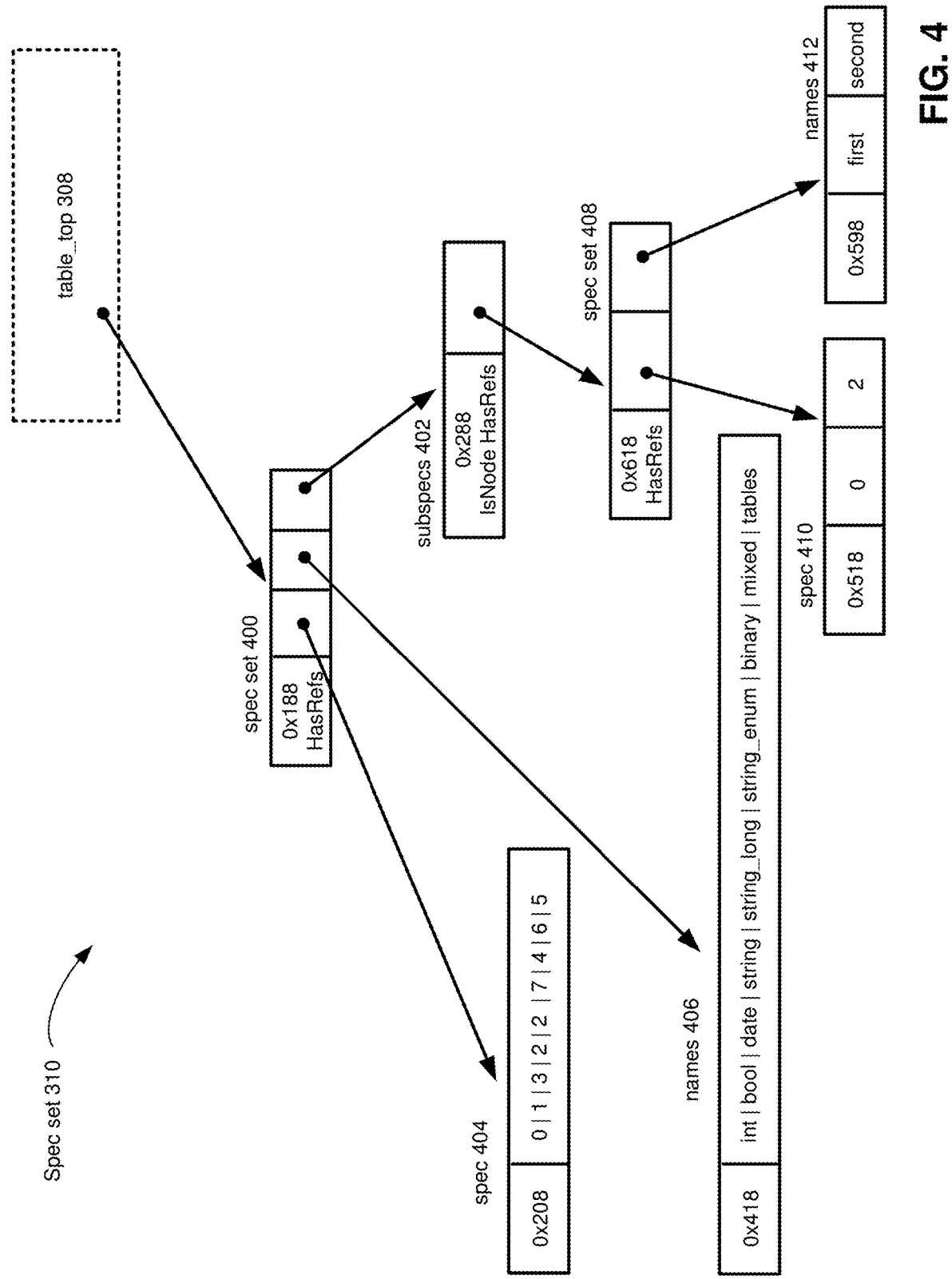
Figure 5:
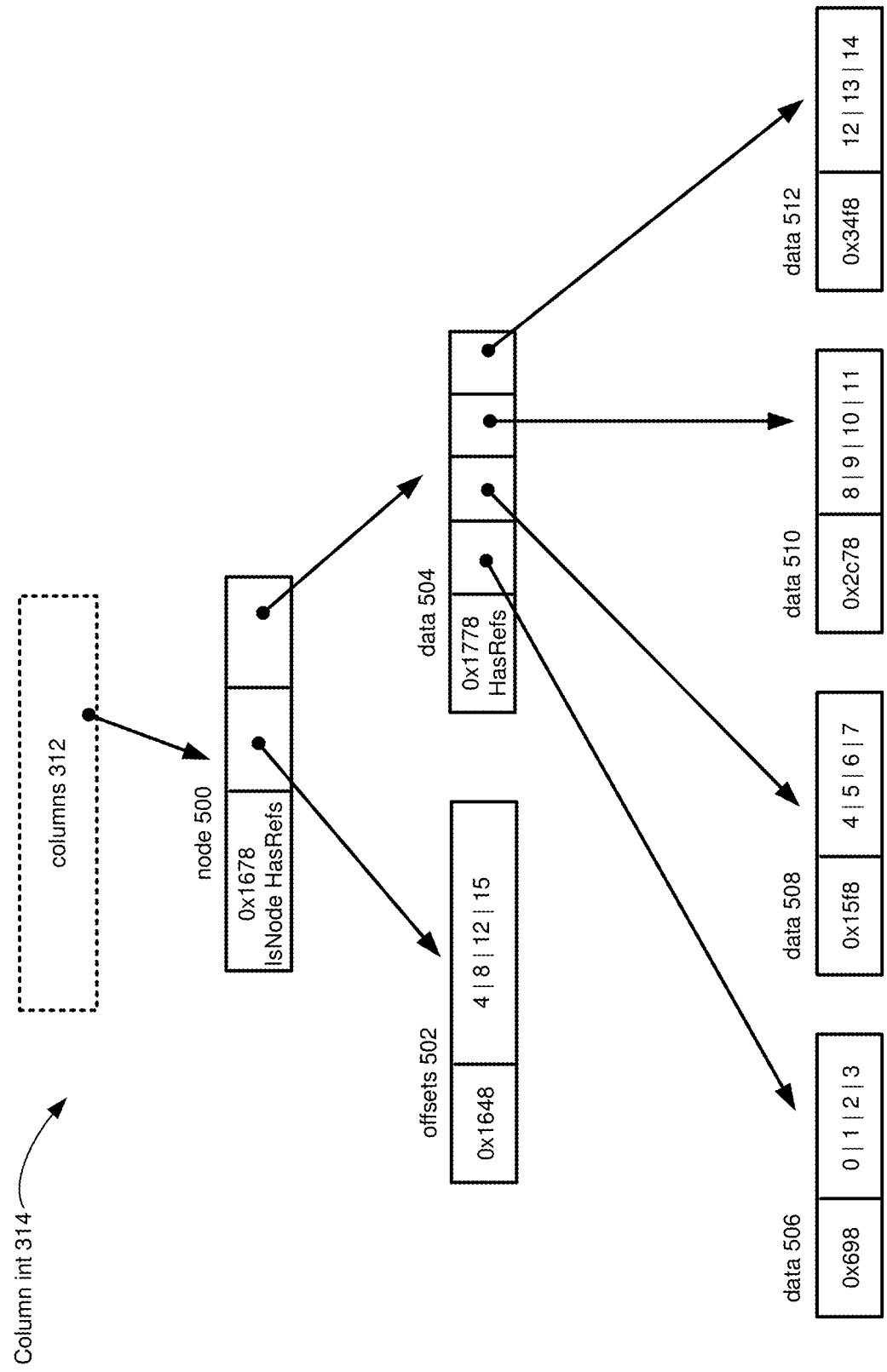

Starting with FIG. 3 the database 300 is shown. The database 300 is entirely composed of adaptive arrays, recursively arranged as a B-tree. For convenience, the phrase "adaptive array" will be dropped from the remainder of this discussion, but the items depicting arrays in FIGS. 3-5 are all adaptive arrays, e.g. group_top 302, table_names 304. Starting at the top, the group_top 302 is shown which is a holder for a group of database tables. The group_top 302 points to table_names 304 and tables 306. The table names 304 provides the human names of the tables, e.g. "test" in this case. Tables 306 has links, e.g. "HasRefs", to the tables themselves. The table structure starts with the table_top 308 which, in turn, has links to the specification, spec set 310 (shown as a dotted box on FIG. 3 and shown in detail on FIG. 4) and the columns 312 themselves. The columns 312 has a row for each column of the table and a link to the structure holding the column, e.g. column int 314, column bool 316 (both shown as dotted boxes on FIG. 3, remaining columns omitted for clarity; column int 314 will be shown in detail on FIG. 5). The hex values shown are the memory locations of the respective arrays, e.g. 0x8 for group_top 302 means it is stored at that location. The reference is relative to the start of the file or memory and thus in one embodiment are identical in volatile and nonvolatile memory.

Turning to FIG. 4 the spec set 310 is shown in greater detail. Table_top 308 links to the spec set 400 which, in turn, links to the spec 404, the names 406, and the subspecs 402 The spec 404 indicates the type of each column; in one embodiment integers are used to represent the different types. For illustration purposes and to save space, the pipe character, "|", was used in the figure to separate array elements. In names 406 the strings representing the field names are shown. Notice the positional correspondence, e.g. the first entry of the spec 404 and names 406 correspond. The table type produced subspecs 402 which, in turn, links to spec set 408 having similarly corresponding spec 410 and names 412 arrays.

Turning to FIG. 5, a portion of the data in our sample database 300 can finally be seen, specifically the first column, int. FIG. 5 includes the column int 314. The columns 312 links to the node 500 which, in turn, links to the offsets 502 and the data 504. The data 504 itself is then stored in four more arrays linked from data 504: data 506, data 508, data 510, and data 512. Again, the pipe character is used to separate array elements. Note that the offsets indicate the B-tree breakpoints.

In the interests of conserving space, the other columns are not shown. However, similar storage approaches to that shown for column int are used. For the enumeration column an additional single array can store the lookup, e.g. $0^{th}$ position holds the string "test0", $1^{st}$ position holds the string "test1", etc. In some embodiments, this array is itself considered an extra column at the root level, e.g. in columns 312. For the subtables, each record itself holds a table stored as arrays similar in structure to one shown for the columns 312. For the long strings, at the storage level there is an array of offsets (lengths and thus implicitly starting positions) and a "blob" of data up to the array limit. In contrast, the shorter strings are stored directly in a packed format. As noted earlier, both string storage formats are highly optimized for substring searches, e.g. it is possible to search in continuous memory blocks without regard to string boundaries and the boundary can be determined easily from the offset information after the fact.

In one embodiment, all arrays are stored with 64 bit alignment. This in turn means that the low bits of a value can only be zero when referring into an array. This in turn allows several optimizations, notably in the implementation of mixed columns, where store integers can be stored directly in a hasRefs-style array. This can be done by setting the lowest bit and then using shift operations to move the value in and out to read the value. Similarly, in this embodiment, when the lowest bit is set, the system can recognize that the value is not a ref, so it will not follow the reference during cleaning, serialization or other tree operations.

Standard B-tree management algorithms can be used to insert and delete items into this structure in a thread-safe fashion. As discussed, reads can proceed while writes are occurring according to some embodiments. In some embodiments, writes are appended with the B-trees arrays adjusted to point to the newly added arrays when the write is finished. Thus, there is always old "stale" data that is consistent for the read to work on. This copy-on-write behavior and the deep recursion that it allows is a key feature in some embodiments. Specifically, by moving towards copy-on-write, embodiments are highly optimized for flash, or solid-state, drives as the storage format for non-volatile memory. Further, because the data structure and the behavior is recursive, there is a large performance win for relatively little code. Additionally, as discussed the copy-on-write behavior can assist in providing not just durability guarantees for transactions, but also easy rollback without the overhead of traditional log oriented approaches. Overall, copy-on-write also provides improved concurrency support because there is old data that is consistent available for read operations.

Format and Concurrency

As discussed previously, embodiments use a substantially identical in memory (volatile storage) and on disk (nonvolatile storage) format. This eliminates the need for serialization and deserialization and improves performance. Of note, in some embodiments an append-only strategy is used for storing the data. This means that new data is appended to the end of the memory space/disk space in use. This provides for extremely high performance on solid-state drive systems using flash memory because costly erase cycles can be all but eliminated or delayed until a large amount of data is appended.

Zig-Zag Search Technique

Some embodiments implement a specialized search strategy for efficiently returning multiple rows from a multi-criteria search. This is particularly because multi-criteria search represent a large proportion of real world searches. As such, traditional database systems often include complex query optimization engines; however, such optimization techniques can often impose high constant time for query optimization as well as have unpredictable runtime behaviors. Our approach has a predictable linear running time with low constant overhead, e.g. $O(n)$, for straightforward queries. More complex composite queries may incur higher running times.

Consider a database table with three integer rows where we want to find all rows matching four criteria. If the rows are named first, second and third, then a naive search for the first matching row (implemented using arrays as a data structure in a C-like language) might look like:

```
size_t find(size_t start, size_t end) {
    while(start < end) {
        if (first[start] > 5 &&
            first[start] < 10 && second[start] == 200 &&
            third[start] != 0) return start;
        start++;
    }
    return -1;
}
```

A first optimization would reduce comparisons by ordering the criteria such that the least frequently true conditions come first (provided that the programming language evaluates conditions from left to the right and halts evaluation of conditions at the first false condition). If the truth table for each criteria looks like the one in FIG. 6 (blank means false, and ignoring the arrows), an optimal order for the criteria would be: second [start]==200 & & first[start]>5 && third [start] !=0 && first[start]<10

However, this sort of manual query tweaking does not scale well. Accordingly, an approach that determines a good order for criteria evaluation on-the-fly, avoids the need for statistics profiling, and adapts automatically is described. More specifically, truth frequencies can be highly variant throughout the totality of a table's rows, traditional profiling would typically order criteria by average frequency over all rows. We refer to our approach as a zig-zag search technique.

The zig-zag approach includes testing each condition in its own loop that runs while the condition is false and then jumps to another condition on exit. Continuing the C-style example and for the example data of FIG. 6, the code could look like:

```
size_t find(size_t start, size_t end) {
    size_t i = start;
    while (i < end) {
        size_t orig_start = i;
        while (i < end && !(first[i] < 10)) i++;
        while (i < end && !(first[i] > 5)) i++;
        while (i < end && !(second[i] == 200)) i++;
        while (i < end && !(third[i] != 0)) i++;
        if(i < end && i == orig_start) return i;
    }
    return -1;
}
```

Note that the sample code can evaluate some of the conditions a second time for a row that is returned as a match (this can be optimized away by incurring an additional test after each condition loop).

Figure 6:
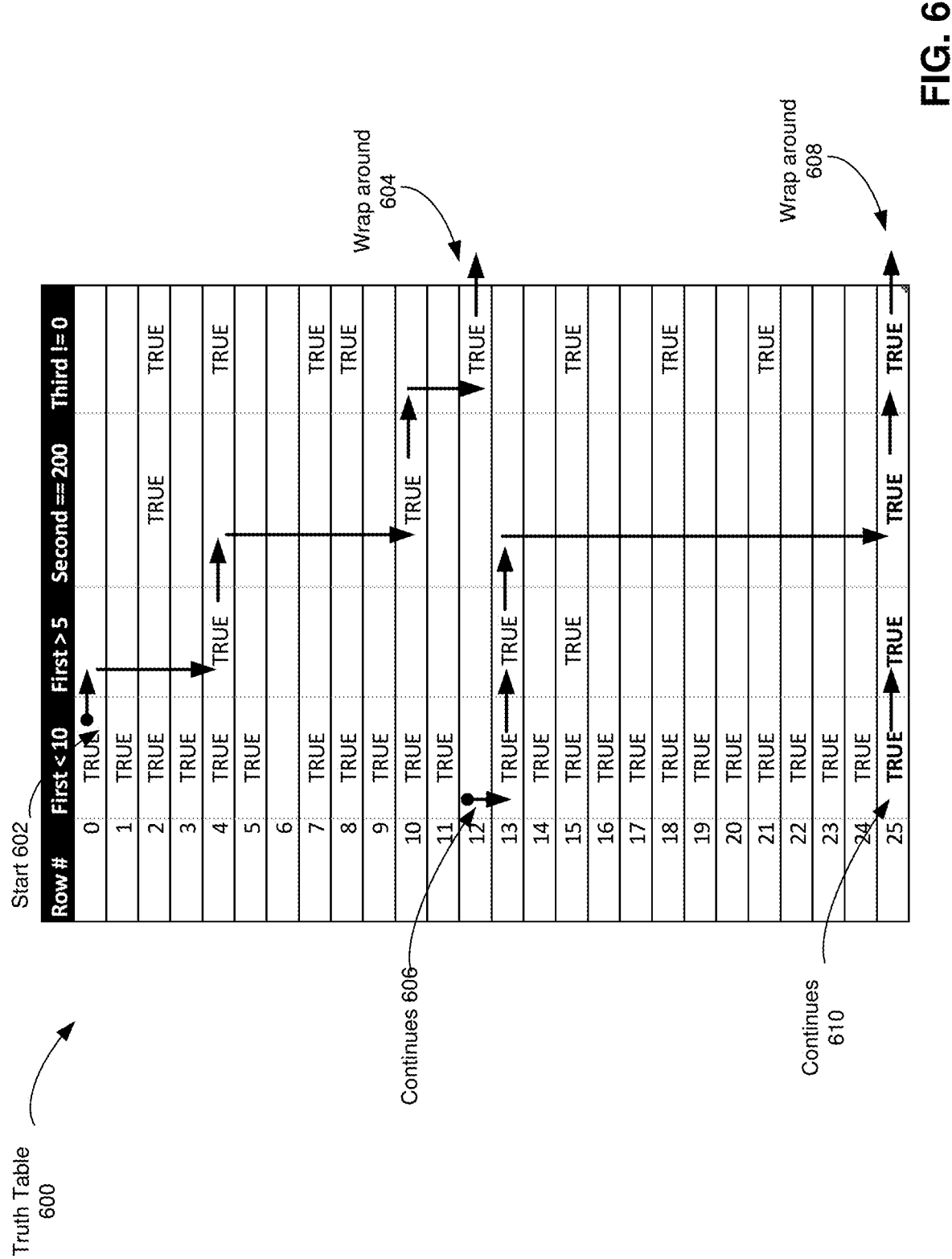
FIG. 6 illustrates a zig-zag search technique used by some embodiments.

The flow of comparisons is illustrated in FIG. 6 where a transition to another condition loop is indicated by an arrow. This technique can be visualized as a ball that drops downwards by gravity and rolls to the right on each true condition, or zig-zagging across the data. Most time is spent (the ball drops furthest down) inside the criteria loop that is most commonly false. Hence, the number of comparisons is reduced. The method is not guaranteed to find an optimal path, only a highly efficient path in the average case. Thus, the flow of the search would start at start 602 and test conditions along the path of the arrow before reaching row 12 where the search would wrap back to the first criteria, and wrap around 604 to continues 606. The search would then continue down to row 25 where it would wrap back to the first criteria, and wrap around 608 to continues 610. The search would finish in row 25 and return after testing the remaining criteria for the first, or in some cases the second time.

Before generalizing this approach (see FIG. 7 discussion below), some additional advantages should be considered. Because, according to embodiments, data is stored in a packed, column-oriented format, the retrieval times for accessing data within the same column are improved. Further, in some embodiments SIMD and/or vector instructions can be used to test multiple rows simultaneously for matches. For example, if the data size is such that 8 values fit into 64 bits, then all 8 values could be tested simultaneously.

Figure 7:
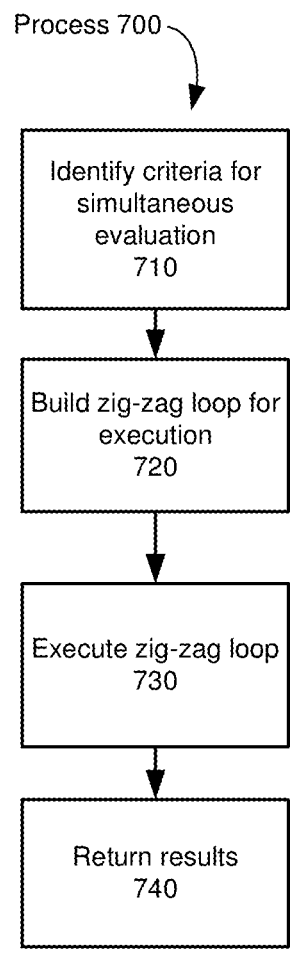
FIG. 7 is a process flow diagram for a zig-zag search according to one embodiment.

We turn now to FIG. 7, which is a process flow diagram for a zig-zag search according to one embodiment. FIG. 7 includes a process 700 for performing a query. The process starts at step 710 by identifying all of the criteria in a received query that can be simultaneously evaluated. For example, depending on grouping of criteria (or, not), as well as any aggregation (sum, max, min) in the query as a whole, it may be necessary to decompose the query into multiple subqueries. Note "and" is omitted from the preceding list because in and of itself, "and" criteria do not require decomposition. The remainder of the process 700 will be described assuming that all of the criteria of the query can be simultaneously evaluated. If not, then multiple flows of process 700 could unfold for each subquery with the results merged at the end (not shown in FIG. 7). More generally, process 700 can be parallelized with subqueries executed in parallel.

Next at step 720, a zig-zag loop is constructed. The basic approach shown in the example above can be used. However, extensions such as multiple comparisons using SIMD instructions and bitmap mapping are also possible. In some embodiments, when multiple values are tested simultaneously, the first "fail" causes the transition to the next column. This still might allow a large number of values to be skipped in a single comparison operation. Constructing a loop is necessary because, unlike in the C-example, the query processor must dynamically execute arbitrary queries against arbitrary databases as opposed to static pre-written code for a specific example. In one implementation, the loops is constructed in an object-oriented fashion by calling objects that offer a Find (first, end) method on condition objects. These methods return the row number of the first row in the range [first, end-1] matching the condition. By implementing object classes for each condition, e.g. ==, <, >, <=, >=, !=, each condition object can contain in one embodiment a single subobject. At the query build time (e.g. step 720), the objects are setup to contain each other in a chain and call each other's Find ( )methods so that the program flow will be as seen above.

At step 730, the loop from step 720 is executed to compute results. In one embodiment, the results are themselves an adaptive array similar in structure to the database as a whole, and the array contains links to the original table for each matching row.

Finally, at step 740, the results are returned. The return format can take a number of forms as discussed above. In one embodiment, the return format is itself a table directly linked to the original table, thus allowing easy modifications. In one embodiment, the results are copies of the original data itself as opposed to links. The return format may be a programmer choice.

Advanced Transaction Support

Some embodiments support additional transaction support. Consistent with existing databases, transactions allow a group of related operations on the database to be grouped so that all of the operations in the group succeed or fail as a whole. Embodiments support decoupled reads and writes, this enables reads to continue during writes and writes to commence while there are readers. This is implemented by providing a fully consistent and isolated snapshot at the start of each transaction.

The main enabler of this transaction approach is the data structure discussed, supra, the entire database is a tree. In contrast most traditional databases use multiple, heterogeneous data structures for things like schemas, indexes, log files and the actual tables and data themselves. As discussed, a copy-on-write approach allows multiple versions of the same database to be maintained concurrently, each sharing unchanged nodes. If each transaction is a separate snapshot, then MVCC (multi version concurrency control) follows. Read operations can proceed independently of other readers and writers, simply taking the latest snapshot. In one embodiment, writers are coordinated, so that only a single write transaction is active at a time. A simple mutex, can be used to implement this without affecting readers.

Compared to traditional MVCC database implementations which tag each row with version info, the query overhead of version checking the validity of every matching row is removed. This in turn allows embodiments to make greater use of performance optimizations like vectorization.

Embodiments make use of versioned free space tracking to support this implementation. Typically, to guarantee that data is consistent even after a crash, traditional databases write data at least twice: a write log of all changes and then writing the actual data to the db. A simple and faster approach is to track free space in the database file e.g. in the tree itself see FIG. 3 with an additional free space list array), and record which version the free space came from. Thus, upon a deletion of an array, the corresponding free space is tagged with the version it was deleted from. This removes the need for traditional garbage collection. While a database is being actively accessed a (transient) list of versions in use can be maintained. Thus if there are 1000 readers and 10 writers, the oldest and newest version in use across all 1001 simultaneous accesses (assuming one write/time) can be tracked. To commit a new change by a writer, space that is no longer in use by any active version can be reused without impacting any of the readers and can be removed from the list of free space. Thus a write operation can be finalized with a single atomic operation to replace to top pointer of the tree and the database is moved to the next state in an ACID-compliant fashion, that is resilient to crashes at any point during the commit.

This will be explained further in connection with FIGS. 8-10. FIG. 8 shows a portion of two versions of a database. FIG. 9 shows a space version table maintained according to one embodiment. FIG. 10 shows a symbolic representation of the storage of multiple versions of the data in memory.

Starting with FIG. 8, two versions of a database, e.g. database 300, are shown: version 800 (v100) and version 810 (v101). The two versions reflect an attempt to change a single value (value to change 820) to a different value (changed value 830). The portions of the database that are exclusive to v101 are shown with stippled background. Notice the copy-on-write behavior: a new array was created to hold the single changed value 830, then that arrays parent can be created and lastly, in this example, the new root created (atomically). If the system crashes, the database is fully consistent at all times.

To avoid the need for complex garbage collection routines, when an array is no longer referenced, e.g. the array holding value to change 820, it is added to the space versions table 900 of FIG. 9 along with the last version it was a part of. In this example, assume the array holding value to change 820 was in space id 2, thus an entry "2" and "100" is reflected in the space versions table 900. The memory occupied by the database in the computer memory can be symbolically represented as a compact two-dimensional grid, e.g. memory 1000 of FIG. 10. The spaces 1010 comprising the arrays holding the database are shown. Stippled spaces are active, unfilled spaces are spaces listed in the space version list (or unallocated space). This approach helps reuse the existing allocated space for the database over time to avoid an ever-growing file. This approach also provides for very fast allocation, especially if additional information, e.g. size of spaces, is stored in the space version table. If you need 100 bytes for a new array, the space versions table 900 can be searched in linear time for the free space with at least 100 bytes available. Other optimizations to the storage of the space versions table 900 for searching may be employed as well.

Thus if a new write operation arrives, e.g. after the one that created v101, and the oldest version being currently accessed is version 97, the copy-on-write process to create v102 can make use of spaces 1 and 4 of FIG. 9 since were deleted in versions older than the oldest access.

Transactions are a natural extension of this practice, a begin/end transaction construct can be added supported languages. For example, one embodiment adds a read and write grouping construct to the language to enable integration and transactions to be identified. For example, in Javascript a SharedGroup( ) class with read( ) and write( ) blocks is added:

```
// open a shared group
var shared_group = new tightdb.Sharedgroup("employees.tightdb");
// Read transaction
shared_group.read('employees', function(table) {
    console.log(table.length( )); // => 5
});
// Write transaction
shared_group.write('employees', function(table) {
    table.add({name: "Joan", age: 42, hired: true});
});
```

Other constructs including support for rollback( ) and testing if database state has changed since last transaction. The has_changed( ) test is a low cost poll (check of the most current version number vs. version number you are using) and is extremely low overhead.

Transaction performance was compared using a C++ test harness on a simple database of 100,000 rows of two columns (x and y) of randomly generated integers in the range 0 to 1000. Reader threads perform the query (or equivalent) "SELECT COUNT(*) FROM test WHERE test.y=Y" for a randomly picked Y in the same range. Writer threads perform update the query (or equivalent) "UPDATE test SET test.x=X WHERE y=Y" where X and Y are randomly picked in the same range. On a test computer with an Intel Core2 (2.66 Ghz) dual processor machine with 2 GB of RAM and 250 GB drive space running Debian GNU/Linux (6.0.06) and ext3 file system, the MySQL (innoDB storage), SQLite, SQLite with writeahead logging (WAL), and a test embodiments of the tightdb solution described herein were compared. The number of reader/writer threads was varied (see table) and each run was performed for 120 seconds, overhead was excluded so only transaction time was counted (larger numbers are better, numbers rounded to nearest tenth of a second).

| | Database | | | | | | | | | |
|---|---|---|---|---|---|---|---|---|---|---|
| | 1 | 2 | 3 | 4 | 5 | 6 | 7 | 8 | 9 | 10 |
| Transactions per Second (2 writer threads; # of readers as indicated) (larger is better) | | | | | | | | | | |
| MySQL | 5.8 | 4.7 | 3.8 | 3.4 | 2.9 | 2.5 | 2.3 | 2 | 1.8 | 1.6 |
| SQLite | 9.5 | 7.5 | 6.7 | 5.6 | 4.8 | 4.3 | 3.8 | 3.7 | 3.2 | 3.1 |
| SQLiteWAL | 26.2 | 19 | 16.1 | 14.1 | 12.4 | 10.9 | 9.8 | 8.8 | 8.1 | 7.4 |
| Test Embodiment Tightdb Solution described herein | 3554.2 | 5803.1 | 4601.8 | 3896.8 | 3335.4 | 2921.1 | 2608 | 2385.3 | 2150.7 | 1975.2 |
| Transactions per Second (8 writer threads; # of readers as indicated) (larger is better) | | | | | | | | | | |
| MySQL | 1.9 | 1.7 | 1.6 | 1.5 | 1.5 | 1.3 | 1.3 | 1.2 | 1.2 | 1.1 |
| SQLite | 1.2 | 1.2 | 1.3 | 1.3 | 1.3 | 1.2 | 1.3 | 1.3 | 1.3 | 1.2 |
| SQLiteWAL | 10.7 | 9.5 | 8.8 | 7.7 | 7.2 | 6.8 | 6.3 | 5.8 | 5.6 | N/A |
| Test Embodiment Tightdb Solution described herein | 1507.6 | 2279.6 | 2151.1 | 1875.1 | 1794.2 | 1695.7 | 1591.9 | 1485.3 | 1384.2 | 1314.0 |

These number represent a factor of nearly 100× over these competing solutions. Performance metrics have been confirmed with other examples.

Conclusion and Additional Embodiments

We have now described a system and processes that provide an easy way to use existing general purpose programming languages to program use of a database in a manner that offers ACID and relations as a first-order programming construct with predictable time properties more consistent with native types such as integers and arrays.

Some additional embodiments and features include:

Low-Level Features

Column store—As discussed embodiments are implemented as a high efficiency column-oriented database using a recursive, adaptive array B-tree structure.

This provides for an ACID database that can support structured and unstructured data simultaneously with a substantially identical memory/disk format (e.g. volatile and nonvolatile storage).

Embodiments pack data into the adaptive arrays avoiding compression which is common in many column-oriented databases. The packed data can easily be operated on using bitmap techniques and SIMD instructions for lookups.

Some embodiments can be viewed using 64 bit packed data structures that are processor and cache aligned. Other embodiments use other multiples of the processor data length and/or cache architecture length.

Some embodiments do not directly index any columns and provide speed comparable to indexed columns. This is achieved because of the packed arrays and the use of bitmap techniques and SIMD instructions on the packed arrays to look up data.

Some embodiments automatically enumerate data types and create a (hidden) lookup column, e.g. if provided repetitive strings such as Q1, Q2, Q3, Q4, those could be stored as 0-to-3 with a lookup table translating Q1-to-Q4 into those values.

Some embodiments use a zig-zag search technique for highly efficient searching of data.

Some embodiments maintain historical data in the database by preserving old versions of the B-tree indexes. In such embodiments, instead of modifying an array or B-tree, a new one is created with the new data and the pointers are adjusted, while leaving copies behind of the old version. This can allow a programmer to "roll back" to earlier transactions without significant storage overhead. Such embodiments may offer cleanup mechanisms to purge the database of such prior versions and old adaptive arrays.

High-Level Features

Some embodiments can be understood as providing a mechanism to replace an arbitrary data structure in a program with an ACID-compliant database. This new database is thread-safe and provides performance and interaction comparable to native data structures, e.g. low constant access time, O(1) for array-type accesses by index, O(n) for iterating over structure, and also providing O(log n) searches with query capabilities.

In some embodiments, the database capabilities are directly embedded into the language, while in others the capability is added via a library and existing extension mechanisms of the language.

In some embodiments, links are supported to provide join-like functionality without the overhead of joins.

Some embodiments support single writers with non-blocking reads.

Some embodiments support replication of the database across multiple machines, e.g. embedded and replicated master-master with single writer.

Document Columns—In some embodiments mixed columns can be used to store JSON information (or similar serialized data such as XML) as nested tables within a single entry of a single row.

Verticals

Some embodiments encourage development of alternative web (and mobile) application delivery through a switch to separate databases per entity (e.g. users) and direct migration of the entity database closer to the entity's assigned application engine.

Some embodiments provide for data warehousing and support for star-schemas through the use of links.

Some embodiments are particularly well-suited for analysis of time-series due to the presence of an order in the columns. Thus, in a SQL-style database, a query to find every stock that went up 5 days in a row is a difficult query. However, in embodiments it is a trivial table scan, since the pricing data would be organized by date.

Some embodiments are particularly well-suited for DNA/RNA sequencing and analysis. The ordering and the packed data structure make it easy to use regular expression matching on the packed arrays to find matches.

In one embodiment, the approach can be used for social networking data, e.g. Facebook or Google Plus, by creating separate entity databases for each user and storing some or all of their social graph information in that database. This is also a good example of where the links capability discussed herein can be particularly valuable. For example, if comments could go in the posted user's database with links in the posting user's database or vice-versa.

Any data structures and code described or referenced, above, are stored according to many embodiments on a computer-readable storage medium, which may be any device or medium that can store code and/or data for use by a computer system. This includes, but is not limited to, volatile memory, nonvolatile memory, application-specific integrated circuits (ASICs), field-programmable gate arrays (FPGAs), magnetic and optical storage devices such as disk drives, magnetic tape, CDs (compact discs), DVDs (digital versatile discs or digital video discs), or other media capable of storing computer-readable media now known or later developed.

The preceding description is presented to enable the making and use of the invention. Various modifications to the disclosed embodiments will be apparent, and the general principles defined herein may be applied to other embodiments and applications without departing from the spirit and scope of the invention. Thus, the invention is not intended to be limited to the embodiments shown, but is to be accorded the widest scope consistent with the principles and features disclosed herein. The scope of the invention is defined by the appended claims.

What is claimed is:

1. A system for providing services to a plurality of users, the system comprising:
a nonvolatile storage, the nonvolatile storage including a plurality of databases corresponding to a plurality of entities, each database in the plurality of databases respectively corresponding to a single entity of the plurality of entities; and a computer in communication with the nonvolatile storage via a communications network, the computer including a volatile memory and a controller, wherein the controller is configured to:
receive a search query over the communications network, the search query including a request for data relating to a first entity,
retrieve a database from the plurality of databases in the nonvolatile storage and deliver the database into the volatile memory over the communications network, the database corresponding to data for the first entity
perform a searching operation on the database in the volatile memory, and
generate a search result for transmission over the communications network, the search result being responsive to the request for data included in the search query, wherein a storage format of the nonvolatile storage and a storage format of the volatile memory are substantially identical such that data serialization and data deserialization is not needed when transferring data between the nonvolatile storage and the volatile memory, and wherein the database is represented as a packed, column-oriented storage of data in a B-tree structure that is recursively composed of a plurality of arrays.

2. The system of claim 1, wherein the controller is further configured to store the database in the nonvolatile storage after the search result is generated.

3. The system of claim 1, wherein the search operation includes one of:
(i) creation of at least one new record in the database, (ii) retrieval of at least one record in the database, (iii) update of at least one record in the database, and (iv) deletion of at least one record in the database.

4. The system of claim 1,
wherein the plurality of arrays include adaptive arrays, and
wherein, for each adaptive array, a data structure of the adaptive array is modified to accommodate a largest size amongst values of the array.

5. The system of claim 1, wherein the nonvolatile storage includes a cloud-based storage provided by a first company, and wherein the computer includes a cloud-based processing application provided by a second company.

6. The system of claim 5, wherein the first company and the second company are different entities.

7. The system of claim 5, wherein the cloud based storage includes one of: (i) Amazon S3, (ii) Rackspace Cloud Files, (iii) Microsoft Windows Azure, (iv) Google App Engine, (v) Amazon Dynamo, (vi) a cloud-based key-value store with each value corresponding to a database, (vii) a cloud-delivered Riak database, (vii) a cloud delivered Couchbase database, and (viii) a cloud-based file store with each file corresponding to a database.

8. The system of claim 5, wherein the cloud-based processing application includes one of: (i) Amazon EC2, (ii) GoGrid, (iii) Microsoft Windows Azure, (iv) Rackspace Cloud Server, (v) Salesforce's Heroku, and (vi) a cloud-based computing-resource delivery service.

9. The system of claim 1,
wherein the database includes a table having a plurality of rows of data, each row of data having one or more columns, wherein the search query includes at least two criteria for searching the database, and wherein the controller is configured to:
construct a zig-zag loop for searching the table; and
executing the zig-zag loop on the table to identify rows matching the at least two criteria.

10. The system of claim 1,
wherein the search operation searches items in the database for true items, each true item satisfying at least one search criteria of a plurality of search criteria of the search query, wherein the searching operation undergoes a plurality of zigzag paths through a table of the database to identify the true items to be included in the search result, the plurality of zigzag paths corresponding to the plurality of search criteria of the search query, wherein each zigzag path proceeds in a first direction from position to position until a first true item is identified, and after identification of the first true item proceeds to a next position in the first direction and, if no true idem is identified, then proceeds in a second direction from position to position until a second true item is identified, the second direction being different from the first direction, and after the second true item is identified proceeding to a next position in the first direction and then proceeding in the second direction from position to position until a third true item is identified, and wherein occurrences of the true items in the table are variant such that each zigzag path is variant.

11. A system for providing services to a plurality of users, the system comprising:

a computer that includes a volatile memory and a controller, the computer being configured to communicate with external devices via a communications network, wherein the controller is configured to:
receive a first signal over the communications network from a second computer, the first signal comprising a search query including a request for data relating to a first entity,
transmit a second signal over the communications network to a third computer, the second signal including a request for a database stored in a nonvolatile storage of the third computer,
receive a third signal from the third computer, the third signal comprising the database;
load the database into the volatile memory in a first representation that is substantially identical to a second representation of the database in the third signal received from the nonvolatile storage of the third computer;
perform a searching operation on the database in the volatile memory; and
generate a fourth signal for transmission over the communications network to the second computer, the fourth signal responsive to the request for data included in the search query, wherein the first representation is substantially identical to the second representation such that no data serialization or data deserialization is needed when transferring the database from the nonvolatile storage of the third computer to the volatile memory, and wherein the database is represented as a packed, column-oriented storage of data in a B-tree structure that is recursively composed of a plurality of arrays.

12. The system of claim 11, wherein no boxing or unboxing is needed when transferring the database from the nonvolatile storage of the third computer to the volatile memory.

13. A system for providing services to a plurality of users, the system comprising:
a nonvolatile storage, the nonvolatile storage including a logical database comprising a plurality of entity databases corresponding to a plurality of entities, each entity database in the plurality of entity databases respectively corresponding to a single entity of the plurality of entities; and
a computer in communication with the nonvolatile storage via a communications network, the computer including a volatile memory and a controller,
wherein the controller is configured to:
receive a search query over the communications network, the search query including a request for data relating to a first entity,
retrieve an entity database from the plurality of entity databases of the logical database in the nonvolatile storage and deliver an entirety of the entity database into the volatile memory over the communications network, the entity database corresponding to the data for the first entity
perform a searching operation on the entity database in the volatile memory, and
generate a search result for transmission over the communications network, the search result being responsive to the request for data included in the search query,
wherein a storage format of the nonvolatile storage and a storage format of the volatile memory are substantially identical such that data serialization and data deserialization is not needed when transferring data between the nonvolatile storage and the volatile memory,
wherein the computer is configured to deliver the entirety of the entity database into the volatile memory and to perform the searching operation on the entity database in the volatile memory without using a caching layer and without using a database server layer,
wherein the computer interacts with the entity database as a synchronous first-order object, and
wherein the entity database is represented as a packed, column-oriented storage of data in a B-tree structure that is recursively composed of a plurality of arrays.

14. A system for providing services to a plurality of users, the system comprising:
a nonvolatile storage, the nonvolatile storage including a plurality of databases corresponding to a plurality of entities, each database in the plurality of databases respectively corresponding to a single entity of the plurality of entities; and
a computer in communication with the nonvolatile storage via a communications network, the computer including a volatile memory and a controller,
wherein the controller is configured to:
receive a search query over the communications network, the search query including a request for data relating to a first entity,
retrieve a database from the plurality of databases in the nonvolatile storage and deliver the database into the volatile memory over the communications network, the database corresponding to data for the first entity
perform a searching operation on the database in the volatile memory, and
generate a search result for transmission over the communications network, the search result being responsive to the request for data included in the search query,
wherein a storage format of the nonvolatile storage and a storage format of the volatile memory are substantially identical such that data serialization and data deserialization is not needed when transferring data between the nonvolatile storage and the volatile memory, and
wherein no boxing or unboxing is needed when transferring the database from the nonvolatile storage to the volatile memory.

15. A system for providing services to a plurality of users, the system comprising:
a computer that includes a volatile memory and a controller, the computer being configured to communicate with external devices via a communications network,
wherein the controller is configured to:
receive a first signal over the communications network from a second computer, the first signal comprising a search query including a request for data relating to a first entity,
transmit a second signal over the communications network to a third computer, the second signal including a request for a database stored in a nonvolatile storage of the third computer,
receive a third signal from the third computer, the third signal comprising the database;
load the database into the volatile memory in a first representation that is substantially identical to a second representation of the database in the third signal received from the nonvolatile storage of the third computer;
perform a searching operation on the database in the volatile memory; and
generate a fourth signal for transmission over the communications network to the second computer, the fourth signal responsive to the request for data included in the search query,
wherein the first representation is substantially identical to the second representation such that no data serialization or data deserialization is needed when transferring the database from the nonvolatile storage of the third computer to the volatile memory, and
wherein no boxing or unboxing is needed when transferring the database from the nonvolatile storage of the third computer to the volatile memory.

16. A system for providing services to a plurality of users, the system comprising:
a nonvolatile storage, the nonvolatile storage including a logical database comprising a plurality of entity databases corresponding to a plurality of entities, each entity database in the plurality of entity databases respectively corresponding to a single entity of the plurality of entities; and
a computer in communication with the nonvolatile storage via a communications network, the computer including a volatile memory and a controller,
wherein the controller is configured to:
receive a search query over the communications network, the search query including a request for data relating to a first entity,
retrieve an entity database from the plurality of entity databases of the logical database in the nonvolatile storage and deliver an entirety of the entity database into the volatile memory over the communications network, the entity database corresponding to the data for the first entity perform a searching operation on the entity database in the volatile memory, and generate a search result for transmission over the communications network, the search result being responsive to the request for data included in the search query, wherein a storage format of the nonvolatile storage and a storage format of the volatile memory are substantially identical such that data serialization and data deserialization is not needed when transferring data between the nonvolatile storage and the volatile memory, wherein the computer is configured to deliver the entirety of the entity database into the volatile memory and to perform the searching operation on the entity database in the volatile memory without using a caching layer and without using a database server layer, wherein the computer interacts with the entity database as a synchronous first-order object, and wherein no boxing or unboxing is needed when transferring the entity database from the nonvolatile storage to the volatile memory.

* * * * *